Feb. 11, 1941.   A. B. CLEVELAND   2,231,254
RECAPPING AND RETREADING MOLD
Original Filed April 2, 1937   2 Sheets-Sheet 1

INVENTOR.
ARCH B. CLEVELAND
BY Harold W. Mattingly
ATTORNEY.

Feb. 11, 1941.  A. B. CLEVELAND  2,231,254
RECAPPING AND RETREADING MOLD
Original Filed April 2, 1937   2 Sheets-Sheet 2

INVENTOR.
ARCH B. CLEVELAND
BY Harold W. Mattingly
ATTORNEY.

Patented Feb. 11, 1941

2,231,254

UNITED STATES PATENT OFFICE 2,231,254

RECAPPING AND RETREADING MOLD

Arch B. Cleveland, Los Angeles, Calif.

Original application April 2, 1937, Serial No. 134,493. Divided and this application November 20, 1939, Serial No. 305,236

10 Claims. (Cl. 18—17)

My invention relates to tire vulcanizing molds and has particular reference to a novel full circle mold of the separable halves type.

This application is a division of my copending application Serial No. 134,493, filed April 2, 1937 and entitled "Recapping and Retreading Mold."

In the reclaiming of worn automobile tires it is the common practice to buff off the rubber material at the tread portion of the tire and to apply uncured or semi-cured rubber thereto to build up a new tread thereon. Such new tread material must be vulcanized in place upon the carcass of the tire and for this purpose it is the common practice to employ a mold of the full circle type into which the entire periphery of the tire may be received at one time and within which pressure and heat may be applied to the uncured rubber to complete the curing or vulcanizing thereof. One commonly used form of such full circle mold is known as the clam-shell type wherein the mold is formed into separable sections along a plane extending transverse to the axis of the tire and approximately midway of the tread face thereof so as to provide a lower mold half which may be mounted upon any suitable base and an upper or movable mold half which may be closed down upon the stationary or base half when the tire is in place therein or may be moved to an open position permitting the insertion or removal of the tires from the mold.

Heretofore considerable difficulty has been encountered in separating molds of this character due to the fact that the upper or movable mold half was hingedly secured to the lower half so that upon the insertion of a tire and the subsequent hingedly closing of the mold the arcuate movement of the movable mold section engaged and scraped or pinched portions of the new tread material on the tire unless the tire had been centered in the mold with great accuracy by the operator prior to closing the mold. Even when great care is exercised in the centering of such tires the movement of the upper mold half through such arcuate path tends to cause it to engage one portion of the new tread rubber before it engages the remaining portions thereof, with the danger of displacing or scoring the portions first engaged.

It is therefore an object of this invention to provide a mold of the clam-shell type set forth in which though the movable half of the mold is hingedly secured to the stationary half, the final closing movements comprises a straight line movement of the movable mold half while it is maintained parallel to the stationary mold half and thus avoiding the danger and damage to the tire.

It is also an object of my invention to provide a mold of the character set forth in the preceding paragraph in which the mold halves are separable along a plane transverse to the axis of the tire and mounted for translatory movement relative to each other in the direction of such axis.

It is a further object of my invention to provide a mold of the character set forth in the preceding paragraphs in which the mold halves are hinged together in such manner as will permit both a swinging movement of the halves relative to each other and also a straight line separation between the halves.

It is an additional object of my invention to provide a mold of the character set forth in the preceding paragraphs in which a power means is provided for moving the mold halves toward and away from each other.

It is also an object of my invention to provide a mold construction of the character set forth in the preceding paragraphs in which a wedging means is associated with the power means for providing an increased mechanical advantage during the initial separation of the halves while serving also as a coupling between the power means and the mold during subsequent separation and hinging of the halves.

Other objects and advantages of my invention will be apparent from a study of the following specifications, read in connection with the accompanying drawings, wherein.

Figures 1, 2:
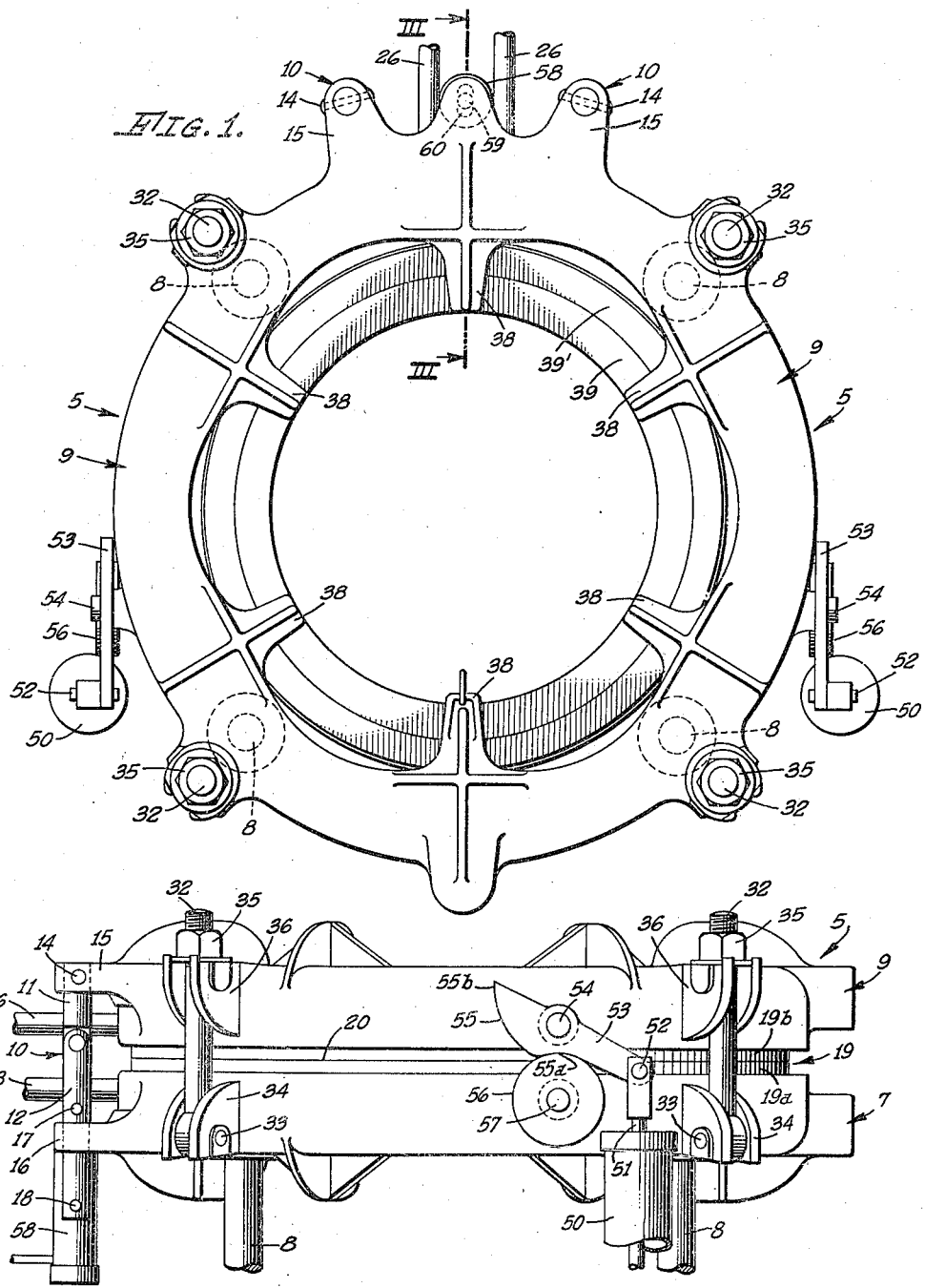
Fig. 1 is a plan view of one form of tire curing mold constructed in accordance with my invention.
Fig. 2 is an elevational view of the mold illustrated in Fig. 1.
Figure 3:
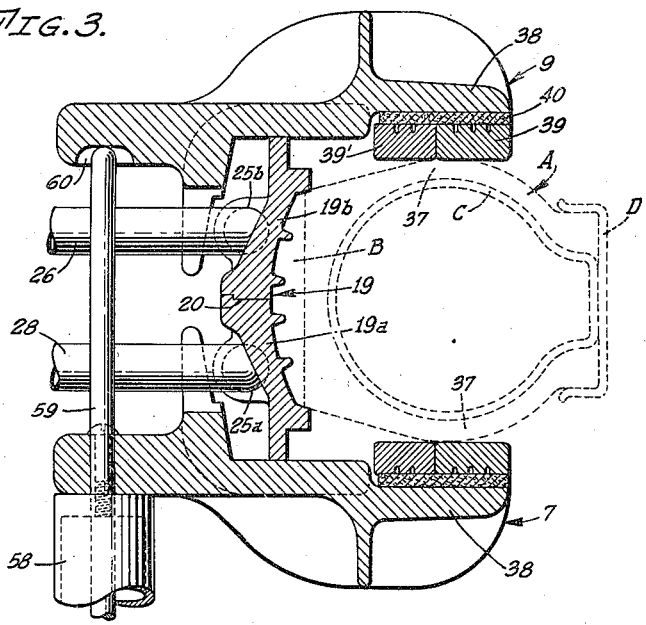
Fig. 3 is a cross section of the mold taken substantially along the line III—III of Fig. 1 and showing the details of interior construction.

Referring to the drawings, I have illustrated the preferred form of mold construction of my invention as comprising a shell or mold 5 of the type known as a full circle mold, that is, the mold comprises an annular ring adapted to receive the entire periphery of the tire and to cure new tread material thereon throughout the full circle described by the tread of the tire in a single operation. The shell 5 is preferably disposed in a horizontal plane and is formed of a pair of separable complementary halves 9 and 7, the lower half 7 constituting a base half which may be supported at any desired height above a floor by means of a support or legs 8.

The upper or movable half 9 of the mold is hingedly secured to the lower half as by means of one or more hinges 10 two of which are illustrated herein and each of which comprises an upper hinge member 11 and a lower hinge member 12 pivoted together as shown in Fig. 2, the upper member 11 being rigidly secured as shown at 14 in a radially extending ear 15 formed upon the upper half 9 while the lower member 12 of the hinge 10 is vertically slidable in a radially extending ear 16 formed upon the base half 7, thus adapting the upper half 9 to be swung hingedly away from the base 7 whenever the mold is to be opened or toward the base half 7 when the mold is to be closed. The slidable engagement of the hinge member 12 with the ear 16 permits considerable latitude of pure translatory movement of the upper half along a straight line path in the direction of the axis of the tire and in a plane parallel to the base half 7 to permit the upper mold half to be moved toward and away from the base half while being continuously maintained substantially level, thus allowing the mold or shell to be opened or closed without any arcuate movement and thus avoiding scraping and injuring the tread material as well as permitting the mold to adjust itself for the reception of tires of different cross sectional diameters. This level vertical movement of the upper half 9 may be limited by means of limit pins 17 and 18 in the lower member 12 of the hinge disposed, respectively, on opposite sides of the ear 16.

The mold or shell 5 constitutes the housing and mounting for a recapping matrix 19 preferably comprising a pair of annular ring members or matrix sections 19a and 19b separated along the line 20 and secured to the corresponding mold halves by any suitable means so that the matrix section 19b is moved toward and away from the matrix 19a as the mold is closed or opened. Each of the matrix sections is provided with a suitable heating element adapted to supply heat thereto, the heating elements being indicated herein as steam pipes 25a and 25b embedded, respectively, in the matrix sections 19a and 19b. Steam may be supplied to the matrix sections by means of pipes 26 and 28 shown in Figs. 1 and 2.

A tire A which is to be recapped is fitted with new tread material B and then mounted upon a rim D with an air bag or inner tube C disposed within the tire. The tire is then placed within the mold and the upper half 9 of the mold is drawn downwardly toward the base half 7 by means of a plurality of hinge bolts 32, the sliding action of the hinges 10 permitting this operation. The swing bolts 32 are preferably pivotally secured as at 33 to outwardly extending lugs 34 on the base half 7 of the mold while the opposite end of the bolts 32 are provided with nuts 35 which may be screwed down upon outwardly extending ears or lugs 36 formed upon the upper half of the mold.

After the tire has been so placed in the mold and the mold sections clamped together as shown in Fig. 2, the inner tube C is inflated to any desired pressure, pressing the new tread material snugly against the interior surfaces of the matrices 19a and 19b.

When the tire is inflated, however, there is a tendency for the side wall portions 37 of the carcass of the tire to expand outwardly and to prevent undue expansion of the side walls of the tire I provide a plurality of inwardly extending radial lugs or ears 38 on each of the mold halves 7 and 9 to which may be secured one or more side wall engaging rings 39 and 39', a pad of asbestos or other heat insulating material 40 being interposed between the lugs 38 and the rings 39 and 39' to prevent undue transmission of heat from the shell to the side wall portions of the tire. In this manner the heat of the matrix is prevented from being transmitted to the old rubber of the side walls of the tire.

In either the recapping operation as described or retreading or similar curing operations the removal of the tire from the mold after the new rubber has been cured requires the lifting or swinging of the upper half 9 away from the lower half 7. During the curing process there is a tendency for the new rubber to stick to the matrices so that it is difficult to separate the matrices from the cured tire. I provide a pneumatic opening mechanism for the mold 5, capable of supplying sufficient lifting power to break the matrices loose from the cured rubber. This pneumatic lifting mechanism is illustrated as comprising a pair of pneumatic cylinders 50 arranged on opposite sides of the mold 5 and secured either to the floor on which the legs 8 rest or secured in any desired manner to the base half 7 of the mold. A piston (not shown) having a piston rod 51 is provided for each of the cylinders 50, the upper ends of the piston rods 51 being coupled as by means of a pin 52 to a cam lever 53 pivoted at 54 upon the upper mold half 9, a cam surface 55 of which bears upon a roller 56 pivoted as at 57 upon the lower mold half 7. The cam surface 55 is preferably of a spiral form having a beginning point 55a located a minimum distance from the pivot point 54, spiraling outwardly from the pivot 54 to an end point 55b disposed a maximum distance from the pivot point. Thus when compressed air or other fluid power is supplied to the cylinders 50 the pivoting of the levers 53 will provide an increased mechanical advantage so as to exert a considerable lifting pressure tending to separate the mold halves 7 and 9.

If desired, a third cylinder 58 may be provided at the rear of the mold 5, the piston rod 59 of which may press upwardly into a socket 60 formed upon a radially extending ear on the mold half 9. The cylinder 58 should be located more or less centrally between the hinges 10 of the mold 5 so that by applying power to the cylinder 58 at the same time power is supplied to the cylinders 50 a three-point lifting of the mold half can be accomplished. Thus the mold half 9 may be lifted directly upwardly until the matrices have been broken loose from the cured rubber and then the mold half 9 may be swung upon its hinges 10 to completely open the mold and permit removal of the cured tire.

Figure 5:
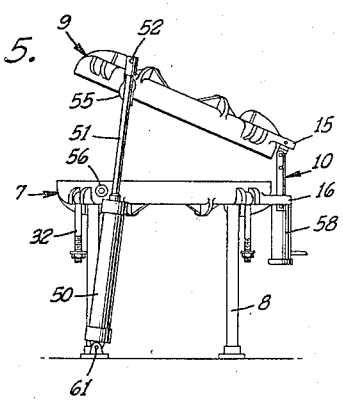
Figure 6:
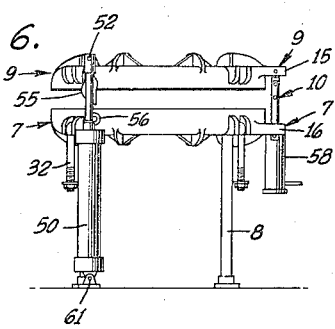

In order to permit the mold half 9 to be swung a considerable distance about the hinge point 10 so as to open the mold widely and permit ready insertion or removal of a tire therefrom, I secure the lower end of each of the cylinders 50 to the legs 8 or floor upon which the legs rest in a pivotal fashion by employing a hinge member 61 interposed between the lower end of the cylinder 50 and the base structure to which it is secured. Thus when it is desired to open the mold, fluid under pressure is admitted to the cylinders 50 and 58, the cylinders 50 operating first to swing the cam or wedging members 53 about their pivot points from the positions illustrated in Fig. 2 to a position such as that illustrated in Fig. 6. As soon as the link 53 is moved to a position disposing the pivot pins 52 and 54 and the hinge point 61 in the same straight line, rotary motion of the link 53 ceases so that this link then operates as a coupling connecting the piston rod 51 directly to the upper mold half 9 so that additional upward movement of the piston rod 51 is translated directly into a corresponding upward movement of the mold half. The upper mold half 9 is thus caused to move in a purely translatory fashion away from the lower mold half 7 while maintaining substantial parallelism between these mold halves until upward movement of the rear end of the mold half 9 is arrested by the pin 18 coming into contact with the lower ear 16. Further upward movement of the piston rods 51 then operates to swing the upper mold half from a position such as that illustrated in Fig. 6 pivotally about the hinge points 10 to a full open position such as that illustrated in Fig. 5.

Figure 4:
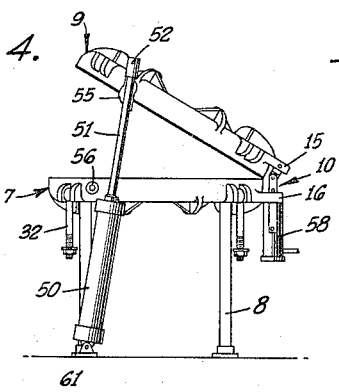
Figs. 4, 5 and 6 are diagrammatic elevational views of the mold of my invention illustrating the successive positions in which the mold halves are placed relative to each other during a closing operation.

When a tire is to be placed in the mold, the mold will be held open as by admitting and maintaining compressed air in the cylinders 50, thus holding the upper half of the mold in open position such as that illustrated in Fig. 4. The tire may then be placed in and centered in the lower or stationary mold half. The operator then closes the upper half of the mold.

However, at some point prior to the actual closing operation, the hinge member 12 should be moved to its uppermost or elevated position as by admitting or maintaining air in the cylinder 58 so that the closing operation may be accomplished by first releasing air from the cylinders 50 and allowing the mold half 9 to swing down to a position substantially parallel with the lower mold half 7. The final closing movement is then accomplished by simultaneously releasing air from the cylinder 58 while the balance of the air in the cylinders 50 is escaping, the mold half 9 then descending in a straight line movement upon the centered tire while being maintained substantially parallel to the stationary mold half.

In this fashion the mold is closed to a sufficiently closed position without applying any forces tending to move the tire out of its desired position. As soon as the upper mold half has come to rest upon the lower mold half, the swing bolts 32 may be applied in the manner previously described and the halves firmly secured to each other thereby.

Attention is called to the fact that as the upper half 9 is lowered in the fashion described the end point 55b of the cam lever 53 comes into contact with the roller 56. In order that this engagement between the cam lever and the roller during closing operation will effect the rotation of the cam lever in the proper direction to restore the parts to the position which is illustrated in Fig. 2, I dispose the end point 55b above a line joining the pivot points 52 and 54 so that when the upper half is lowered the end point 55b will engage the roller 56 at a point to the left of the line mutually interconnecting the pivots 52, 54 and 61 so as to provide a force tending to rotate the link 53 in a clockwise direction to restore this link to the proper position when the mold is closed.

While I have described the power means or pneumatic cylinders and the hinge construction 10 as being applied to a full circle mold designed particularly for recapping operations, it will be readily appreciated that such novel constructions can be advantageously employed with molds of this character regardless of whether such molds are intended or designed for recapping, retreading or complete vulcanizing operations upon a tire carcass.

While I have illustrated a power means comprising a pneumatic cylinder as the means for opening the mold, it will be apparent to those skilled in the art that other mechanisms either manually operated or power actuated may also be employed.

While I have shown and described the preferred embodiment of my invention, I do not desire to be limited to any of the details of construction shown or described herein, except as defined in the appended claims.

I claim:

1. In a tire vulcanizing mold, the combination of: a mold body for receiving a tire and comprising a pair of mold halves separable along a plane normal to the axis of the tire and movable away from each other; power means for separating said mold halves comprising a member movable relative to one of said mold halves in the direction of separating movement of the other of said halves relative thereto; coupling means interposed between said member and said other mold half for translating movement of said member into relative separating movement of said halves; means mounting said coupling means for limited movement relative to said other mold half; and means responsive to said limited movement for applying a wedging force between said halves to start said separation.

2. In a tire vulcanizing mold, the combination of: a mold body for receiving a tire and comprising a pair of mold halves separable along a plane normal to the axis of the tire and movable away from each other; a wedging means normally inter-engaging said halves and mounted on one of said halves for limited movement relative thereto in a direction generally away from the other of said halves; means responsive to said limited movement of said wedging means for wedging said halves apart; and means for applying a force to move said wedging means away from said other mold half, whereby said wedging means and said one mold half are simultaneously moved away from said other mold half upon completion of said limited movement.

3. In a tire vulcanizing mold, the combination of: a mold body for receiving a tire and comprising a pair of mold halves separable along a plane normal to the axis of the tire and movable away from each other; lever means pivotally mounted on one of said mold halves in a position engaging one portion of said lever with the other mold half; and power means secured to said other mold half and coupled to move another portion of said lever means away from said other mold half, said lever means and said power means being so constructed and arranged that actuation of said power means first effects a pivotal movement of said lever means to force said mold halves apart through engagement of said lever means with said other mold half and then operates to move said one mold half and the lever means carried thereby out of engagement with said other mold half through the coupling effected between said power means and said mold half by said lever means.

4. In a tire vulcanizing mold, the combination of: a mold body for receiving a tire and comprising a pair of mold halves separable along a plane normal to the axis of the tire and movable away from each other; a cam member mounted on one of said mold halves for pivotal movement about an axis disposed parallel to the plane of separation of said halves having a camming surface engageable with the other mold half and having a lever portion disposed on the opposite side of said pivotal mounting from said camming surface; and power means secured to said other mold half and coupled to the outer end of said lever portion for moving said end away from the plane of separation of said halves, said cam member and said power means being so constructed and arranged as to first cause a pivotal movement of said camming member to thereby effect an initial separation of said mold halves and then to serve as a coupling between said power means and said first mold half, whereby said power means may move said first mold half sufficiently far away from said other mold half as to move said camming surface out of engagement with said other mold half.

5. In a tire vulcanizing mold, the combination of: a mold body for receiving a tire and comprising upper and lower mold halves separable along a plane normal to the axis of the tire, said upper mold half being upwardly movable relative to said lower mold half; a lever means carried by said upper mold half; a horizontally extending pivot means inter-engaging said lever means and said upper mold half; a roller pivotally mounted on said lower mold half below said pivot means; a camming surface formed on one end of said lever means for engaging said roller means when said lever means is pivotally moved about said pivot means to apply a wedging force between said mold halves; and power means connected to said lower mold half at a point disposed below said pivot means and coupled to the other end of said lever means for moving the other end of said lever means upwardly away from said lower mold half.

6. In a tire vulcanizing mold, the combination of: a support; an annular mold body carried by said support for receiving a tire and comprising a stationary mold half and a movable mold half, said mold halves being separable along a plane normal to the axis of said tire; a hinge member mounted on one of said mold halves for slidable movement relative thereto; a pivot means pivotally securing said hinge member to the other of said mold halves; a mechanism coupled to said movable mold half adjacent said hinge member and independently thereof for moving said movable mold half relative to said stationary mold half; and another mechanism coupled to said movable mold half at a point spaced from said first-named mechanism a distance substantially exceeding ninety degrees, said mechanisms being actuatable simultaneously for moving said movable mold half in a purely translatory fashion in the direction of said axis relative to said stationary mold half.

7. In a tire vulcanizing mold, the combination of: a support; an annular mold body carried by said support for receiving a tire and comprising a stationary mold half and a movable mold half, said mold halves being separable along a plane normal to the axis of said tire; a hinge member mounted on one of said mold halves for slidable movement relative thereto at a point disposed on one side of a transversely extending diameter; a pivot means pivotally securing said hinge member to the other of said mold halves; a mechanism coupled to said movable mold half adjacent said hinge member and independently thereof for moving said movable mold half relative to said stationary mold half; and another mechanism coupled to said movable mold half at a point disposed on the opposite side of said transversely extending diameter, said mechanisms being actuatable simultaneously to move said movable mold half in a purely translatory fashion in the direction of said axis relative to said stationary mold half.

8. In a tire vulcanizing mold, the combination of: a support; an annular mold body carried by said support for receiving a tire and comprising a stationary mold half and a movable mold half, said mold halves being separable along a plane normal to the axis of said tire, one of said mold halves having an apertured lug formed integrally therewith; a hinge member slidably received in the aperture in said lug; a pivot means pivotally securing said hinge member to the other of said mold halves; a mechanism coupled to said movable mold half adjacent said hinge member and independently thereof for moving said movable mold half relative to said stationary mold half; and another mechanism coupled to said movable mold half at a point spaced from said hinge member, said mechanisms being actuatable simultaneously to move said movable mold half in a purely translatory fashion in the direction of said axis relative to said stationary mold half.

9. In a tire vulcanizing mold, the combination of: a support; an annular mold body carried by said support for receiving a tire and comprising a stationary mold half and a movable mold half, said mold halves being separable along a plane normal to the axis of said tire; a hinge member mounted on one of said mold halves for slidable movement relative thereto; a pivot means pivotally securing said hinge member to the other of said mold halves; a mechanism coupled to said movable mold half adjacent said hinge member and independently thereof for moving said movable mold half away from said stationary mold half; another mechanism coupled to said movable mold half at a point spaced from said hinge member, said mechanisms being actuatable simultaneously to move said movable mold half in a purely translatory fashion in the direction of said axis away from said stationary mold half; and swing bolts carried by one of said mold halves and engageable with the other of said mold halves when said movable mold half is moved into abutting relation with said stationary mold half to lock said halves to each other.

10. In a tire vulcanizing mold, the combination of: a support; an annular mold body carried by said support for receiving a tire and comprising a stationary mold half and a movable mold half, said mold halves being separable along a plane normal to the axis of said tire; a hinge member mounted on one of said mold halves for slidable movement relative thereto; a pivot means pivotally securing said hinge member to the other of said mold halves; a mechanism coupled to said movable mold half adjacent said hinge member and independently thereof for moving said movable mold half away from said stationary mold half; another mechanism coupled to said movable mold half at a point spaced from said hinge member, said mechanisms being actuatable simultaneously to move said movable mold half in a purely translatory fashion in the direction of said axis away from said stationary mold half; and coacting means carried by said mold halves and engageable with each other when said mold halves are moved into abutting relation to maintain said mold halves in axial alignment with each other.

ARCH B. CLEVELAND.